Sept. 11, 1945.  M. SHOELD  2,384,773
PHOSPHORIC ACID MANUFACTURE
Filed Jan. 15, 1941  5 Sheets-Sheet 4

Sept. 11, 1945.                M. SHOELD                    2,384,773
                        PHOSPHORIC ACID MANUFACTURE
                    Filed Jan. 15, 1941          5 Sheets—Sheet 5

Inventor:
Mark Shoeld.
By Frank H. Wisch.
Attorney

Patented Sept. 11, 1945

2,384,773

UNITED STATES PATENT OFFICE 2,384,773

PHOSPHORIC ACID MANUFACTURE

Mark Shoeld, Towson, Md., assignor to The Davison Chemical Corporation, Baltimore, Md., a corporation of Maryland Application January 15, 1941, Serial No. 374,591

18 Claims. (Cl. 23—165)

This invention relates to the manufacture of phosphoric acid and more particularly to a process of extracting or leaching phosphoric acid, and apparatus therefor.

Numerous methods have heretofore been suggested for the preparation of orthophosphoric acid including for instance the production of phosphorus in an electric or blast furnace and burning it to pentoxide and the subsequent absorption of the phosphorus pentoxide in water; and the so-called wet processes in which phosphate rock or tri-calcium phosphate is treated with acids such as sulphuric, hydrochloric and nitric acids. Ordinarily in wet processes that have reached the commercial stage, phosphate rock is mixed with sulphuric acid solution to form a slurry and the slurry is filtered or permitted to settle to separate solid unleached material from phosphoric acid solution. A weak phosphoric acid solution of from 20 to 30% $P_2O_5$ is obtained, which must be concentrated by evaporation of the excess water.

In the present process superphosphate, previously prepared from phosphate rock, is treated in stationary beds with sulphuric acid solution that is diffused throughout such beds, wherein it is observed that positive mechanical mixing or stirring and heat are unnecessary in order to accomplish the desired objects. Furthermore, the final product, is a phosphoric acid solution of high concentration of from 40% to 50% $P_2O_5$ obtained direct and without any evaporation, and substantially free from calcium sulphate. Also, although the phosphoric acid solution is not filtered, the product is substantially clear and of relatively high purity. Other advantages will be made apparent in the description of the process given hereinbelow.

Essentially, the chemical reaction involved is between sulphuric acid and the monocalcium phosphate of the superphosphate wherein phosphoric acid is liberated and calcium sulphate forms. The sulphuric acid penetrates the particles of superphosphate and the phosphoric acid is recovered by leaching with a solvent such as water.

A superphosphate product that is particularly useful in the preparation of phosphoric acid in the present process because of the high porosity and the relatively high compression strength and other characteristics of granules of superphosphate, is the superphosphate product described and claimed as distinct from den superphosphate in Reissue Patent No. 19,825, dated January 14, 1936, issued to B. Ober and E. H. Wight, which superphosphate product may be manufactured by the process described and claimed in Patent No. 2,136,793, dated November 15, 1938, issued to W. H. Gabeler, A. C. Wilson, T. O. Tongue, and M. Shoeld. These particular products are prepared by first preliminarily conditioning superphosphate by tumbling the same in the presence of an aqueous medium in amount sufficient to cause nodulization and in a substantially non-drying atmosphere while moving through a rotary container at atmospheric pressure until the mass is agglomerated to firm nodules. Directly thereafter, the material thus conditioned is heated in a drying atmosphere while tumbling the same at atmospheric pressures in a stream moving through a rotary container until converted to discrete, nodular, encrusted and indurated globoid particles. If desired these particles may be screened to obtain a suitable mesh (for instance material passing through a 3 mesh screen but retained on a screen having .0137 inch openings) or the particles may be ground to obtain this mesh. A satisfactory mesh is from about 4 to 20. The volumetric porosity of a granule obtained by the above patented process is about thirty per cent of the total volume of the granule.

A typical analysis of the superphosphate granules obtained by the above patented process is as follows:

| | Percent |
|---|---|
| Moisture | 1.5 to 2.0 |
| Total $P_2O_5$ | 20.5 to 21 |
| Insoluble $P_2O_5$ | 0.4 to 0.8 |
| Available $P_2O_5$ | 20.2 to 20.6 |

As is true of the above patented superphosphate, in the present process a superphosphate must be employed which does not pack or cake when in deep piles.

By way of illustration, reference is made to the accompanying drawings in which apparatus is shown by which the process is efficiently conducted.

Similar parts of the apparatus are designated by the same reference characters.

Figure 4:
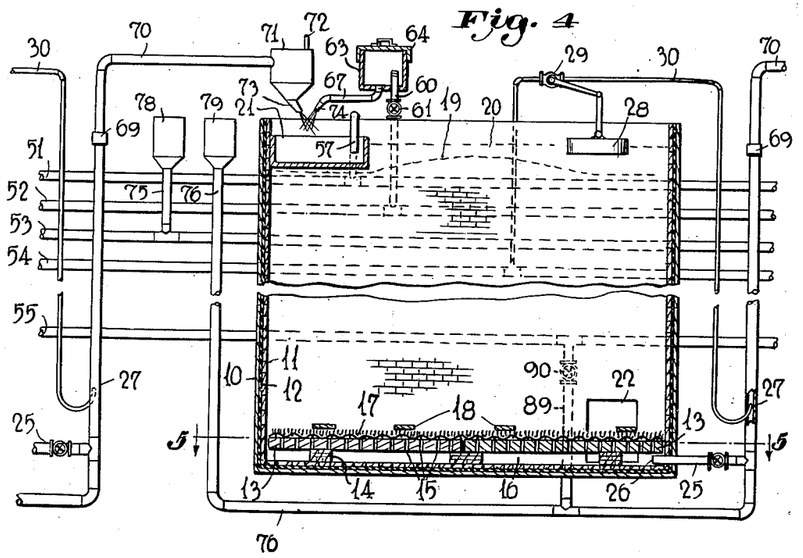
Fig. 4 is a vertical section of a leaching tank, and includes a diagrammatic representation of the piping associated with the tank.
Figure 5:
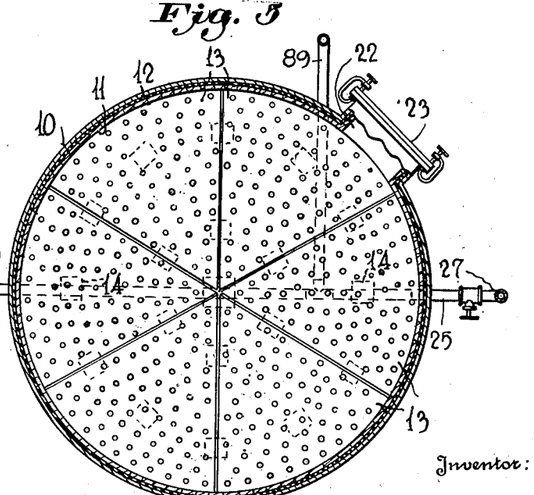
Fig. 5 is a sectional view of apparatus shown in Fig. 4 taken on line 5—5.

The apparatus shown comprises a plurality of tanks details of which are shown in Figs. 4 and 5, and means by which the various steps in the leaching process may be conducted. Although eight leaching tanks numbered consecutively 1 to 8 are shown, the number employed may vary. Six tanks or as many as twelve or more may be conveniently employed in the process. Eight tanks have been found highly practical for commercial purposes. Each tank is of sufficient capacity and shaped to hold a relatively deep bed of phosphate material. Tanks in which as much as 50 to 100 tons or more of superphosphate may be treated at one time, are found desirable.

A leaching tank is constructed of an outer casing 10 of steel lined with acid resistant brick 11 and interlined with a mastic material 12 including a bitumen or rubber. A false bottom 13 is provided which is raised slightly from the bottom of the tank by supporting means 14. The false bottom is preferably constructed of wood and is provided with perforations 15 through which liquid may pass into the space 16. The false bottom 13 may be divided into sections as shown in Fig. 5. A coco matting 17, suitably weighted down by lead weights 18, is superposed on the false bottom 13. This matting, although not entirely necessary, assists in distributing the liquid passing through the bottom 13, and in protecting the surface of the latter.

A leaching tank when charged for operation is filled with solid and liquid almost to the top as represented by the dotted lines 19 and 20 (Fig. 4) respectively. A shallow box 21 is supported inside the tank near the top thereof so that the upper edge of its side wall is positioned slightly above the predetermined level 20 of the liquid in the leaching tank. This box 21 serves as a means in which liquids are mixed as hereinafter set forth prior to admission into a leaching tank, and also serves as a means for gently feeding liquids into a leaching tank without unduly disturbing the upper surface of the materials therein and without causing splashing.

A manhole 22 having a removable cover 23 is provided in the side of each tank adjacent the bottom thereof through which spent solid material may be removed. The removal of such material is effected hydraulically, that is, by directing a stream of water under high pressure through the manhole and into the body of the spent solid material, whereby a slurry is formed which readily flows and is conducted away, as further described below.

A pipe 25 having an open end 26 positioned in the space 16, is connected to an air-lift 27 whereby liquid from the bottom of a leaching tank may be raised to an upper level for distribution selectively to several different parts of the plant as hereinafter set forth.

For the purpose of controlling the flow of liquid in the air-lift, a float 28 is provided in each leaching tank for operating a valve 29 in the air supply pipe 30 for the air-lift 27. The float 28 is positioned in the liquid at the top of the leaching tank and as the liquid rises the valve 29 is operated to increase the supply of air. At a predetermined lower level of the liquid the valve is closed to permit accumulation of liquid in the tank. If desired, well known means may be provided for properly directing any accidental overflow of liquid from a leaching tank.

Figure 1:
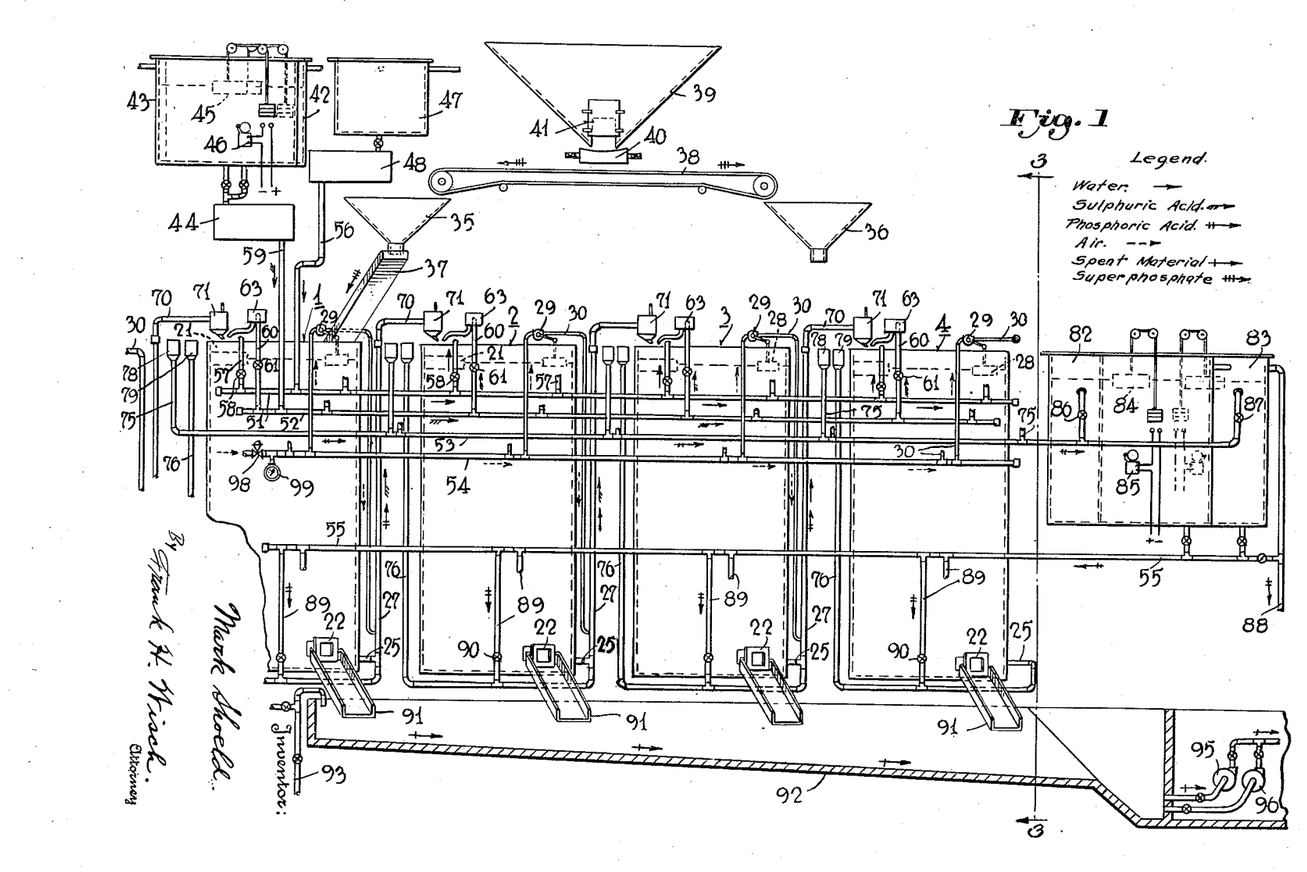
Figure 1 is an elevational view of a plant showing four of the eight leaching tanks in the row in the upper part of Fig. 2, and diagrammatically depicting the piping and material conveying systems employed.
Figure 2:
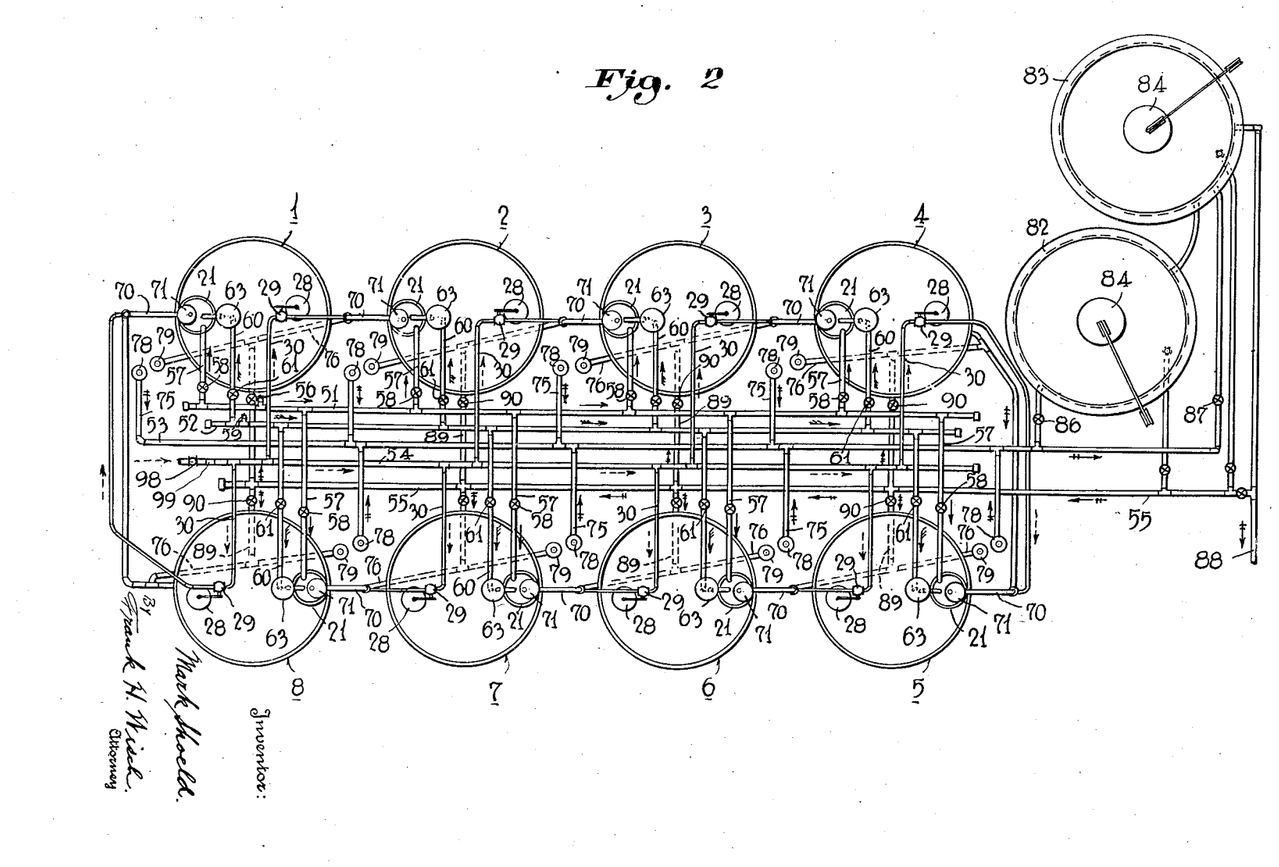
Fig. 2 is a plan view of the plant showing eight leaching tanks and a diagrammatic representation of the piping arrangement therefor.
Figure 3:
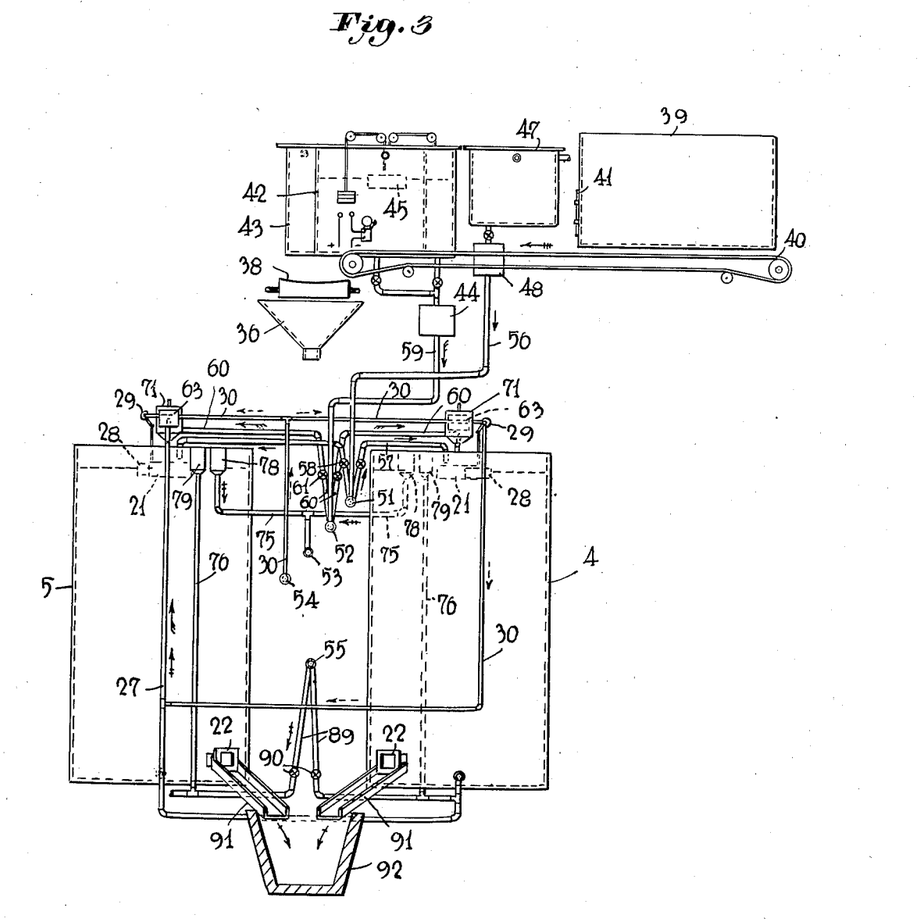
Fig. 3 is an elevational view of the plant taken on line 3—3 of Fig. 1.

Referring to Figs. 1, 2 and 3, leaching tanks 1–8 may be positioned relative to each other as desired. Means are provided above the tops of the tanks 1–8 for depositing superphosphate selectively in any of these tanks. For this purpose hoppers 35 and 36 are conveniently placed so that material deposited therein may be passed down a removable chute 37 into a leaching tank. The hoppers 35 and 36 are fed by a reversible belt 38 which may direct the superphosphate to either one of these hoppers. The superphosphate is originally placed in a V-shaped hopper 39 positioned above a belt 40 which may be a weighing belt. The superphosphate feed rate is adjusted by raising or lowering a leveling gate 41 in the outlet end of the hopper 39.

Two acid supply tanks 42 and 43 for supplying measured quantities of acid at separate intervals in the process, are positioned above the leaching tanks, and a standard control means 44 such as a well known piano box for controlling rate of flow, or a combined head varying means and flow control is connected to each acid tank. Each acid tank is provided with a float 45 and an electric signalling means 46 for indicating when the acid fed to the tank reaches a desired level.

A water tank 47 is likewise positioned above the tops of the leaching tanks, for supplying water thereto. A standard control means 48 similar to control means 44 is likewise provided to regulate the head and also the rate of flow of the water passed into the leaching tanks.

Between the two rows of leaching tanks 1–4 and 5–8, as shown, are a plurality of manifolds 51, 52, 53, 54, and 55 (diagrammatically illustrated). A pipe 56 connects the control means 48 to the manifold 51 for passing water thereto. A plurality of off-take pipes 57 (each provided with a valve 58), one for each leaching tank 1–8, are connected to the manifold 51 and have their open ends in the mixing boxes 21.

Figure 6:
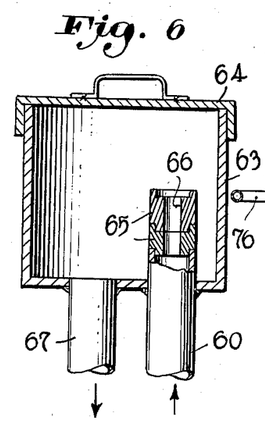
Fig. 6 is a section of a fragment of the apparatus.

A pipe 59 connects the control means 44 to the manifold 52 for passing acid thereto. A plurality of off-take pipes 60, each provided with a valve 61, are connected to the acid manifold 52. Means are provided whereby a given quantity of acid may be distributed through two or more off-takes 60 into two or more leaching tanks in equal portions. To accomplish this, each off-take pipe 60 extends upwardly through the bottom of a small box 63 having a removable cover 64, and shown in detail in Fig. 6. The open end of the pipe 60 is readily accessible for the placement thereon of means for varying the size of the orifice. Such means comprise rings 65 which fit onto the end of the pipe 60 and sleeve into each other and are readily stacked on each other in varying numbers. The number of rings and the selected size of the orifice 66 in the rings depend upon the number of tanks among which the acid is to be distributed. The greater the number of tanks the greater the number of rings used on each pipe 60.

With a given uniform head of acid, and with the open end of each pipe 60 at exactly the same level, and with the same number of rings mounted on each pipe, a measured quantity of the acid is readily equally divided among two or more of the leaching tanks. An operator learns by experience how many rings are needed for dividing the acid into separate streams to be fed simultaneously to any given number of leaching tanks. Leading from the bottom of each box 68 is a pipe 67 the open end of which is positioned to direct acid into the mixing box 21 in each leaching tank.

The air lift 27, supplied by air through pipe 30 which in turn is connected to the manifold 54, extends upwardly to a stuffing box 69 in which is mounted one end of a swinging elbow 70. The other end of the elbow is connected to a small funnel-like, feeding chamber 71 provided with a vent 72 and an outlet pipe 73 in its tapered bottom. The outlet pipe 73 and an endpiece 74 of the pipe 67 are directed downwardly toward each other when the feeding chamber 71 is positioned above the mixing box 21, so that the acid stream from the end-piece 74 and the liquid stream from the outlet 73 impinge upon each other upon entering the mixing box, whereby the liquid and acid are premixed before entering a leaching tank, as illustrated in detail in Fig. 4.

Two upright pipes 75 and 76, each connected at its upper free end to a funnel-shaped receiver 78 and 79 respectively, are connected at their lower ends respectively to the manifold 53 and to the lower end of the air-lift pipe 27 to which the leaching tank outlet pipe 25 is connected. The open tops of the receivers 78 and 79 are so positioned that the chamber 71 may be swung in an arc so as to place it above either receiver. Thus liquid pumped by means of an air-lift 27 may be selectively passed into a mixing box 21 from one leaching tank to the next in a series, or into a receiver 78 and thence into the manifold 53, or into a receiver 79 for the purpose of introducing liquid from one leaching tank into the bottom of the next leaching tank in a series or even to bypass a leaching tank in the series.

The manifold 53 serves to conduct extracted phosphoric acid solution from the various receivers 78 into collecting tanks 82 or 83 or both. The latter tanks are interconnected and each has a capacity of about one-half that of a leaching tank for the purpose set forth below. Each tank 82 and 83 is provided with a float 84 and signal means 85 operated by the float to indicate when these tanks are full. Valves 86 and 87 are provided for cutting off the supply of phosphoric acid to the tanks 82 and 83 respectively.

Each of the tanks 82 and 83 is connected at its bottom to the manifold 55, and to a pipe 88 for passing phosphoric acid to storage. Pipes 89 each having a valve 90 connect the manifold 55 to each pipe 76 so that solution from the tanks 82 and 83 can be returned to any of the leaching tanks.

Each leaching tank is so positioned that spent material therefrom is readily conducted from the manholes 22 by means of chutes 91 into a cement trough 92. A hose (not shown) attachable to a high pressure water main 93 may be used for introduction into a manhole for the purpose of hydraulically removing solid spent material from a leaching tank. For this purpose a stream of water is also kept moving in the trough 92 at the rate of about 250 gallons per minute. The spent material in the form of a slurry is pumped away by either pump 95 or 96.

The various conduits and parts of the apparatus that contact acid are made of acid-resistant material.

In connection with the description of the process of the present invention reference may be made to the legend on page 1 of the drawings indicating by means of symbols the paths taken by the different materials in a plant under operation.

Although a considerable number of variations in the operation of the disclosed apparatus is possible, the following procedure is given by way of an example of a highly practical manner in which the various steps in the process may be conducted:

To commence operations in a plant having eight leaching tanks (as shown in the drawings) in each of which about 40 tons of superphosphate are treated at one time, sulphuric acid (98% concentration) is passed from one of the measuring tanks 42 or 43 into leaching tank 1 along with water from the tank 47 in such proportion that about a 25 Bé. solution is formed. When the tank 1 is about one-half full or enough acid solution has been introduced so that a charge of superphosphate is completely covered thereby, the superphosphate is run from the hopper 35 into tank 1 previously partly filled with the acid solution. In this way the fall of the superphosphate is broken and a thorough initial mixture of acid and superphosphate is formed. The proportion of the 98% acid to the superphosphate used in this initial mixture is about 18 pounds of the 98% acid to 100 pounds of superphosphate.

The flow of water into tank 1 is continued and the passage of the 98% acid thereto is discontinued, while solution from the bottom of tank 1 along with sulphuric acid (98%) is passed into tank 2. Enough of this mixture is passed into tank 2 so that when the charge of superphosphate is deposited therein the charge is completely covered by said mixture. Also, the solution from tank 1 and the sulphuric acid (98%) fed to tank 2 are so apportioned that there will be 18 pounds of the acid to 100 pounds of the superphosphate (having the analysis indicated above) in the charge for tank 2.

In charging tank 3, the sulphuric acid for this charge may be apportioned between tanks 2 and 3 and the solution from tank 2 run into tank 3 until about one-half full. Superphosphate is then charged into tank 3. This is repeated for tanks 4, 5, 6 and 7, the water from the tank 47 being at all times continuously fed into tank 1 at a predetermined while acid from tank 42 or 43 is continuously fed proportionately at a predetermined rate into one or more intermediate tanks, or into all tanks except tank 1 and 8. After tank 7 is charged, solution alone from tank 7 is passed from the bottom thereof into tank 8 until the latter is one-half full. Superphosphate is then deposited in tank 8 so that the tank is filled to the top with a mixture of solution and superphosphate, the acid covering the surface of the latter.

In the above starting operation the rates of flow of water and of the acid are initially established so that by the time tank 8 is charged, about eight hours have elapsed, the phosphoric acid solution produced and coming from the bottom of tank 8 is on its way to one of the collecting tanks 82 or 83, and the spent material in tank 1 is about to be removed in order to replace it with a fresh charge of superphosphate. As indicated in the description of the apparatus, when the solution from tank 8 is being passed to a collecting tank 82 or 83, the feeding chamber 71 for tank 1 is swung into position above the receiver 78 shown in Figs. 1 and 2 to the left of tank 1, thus conducting phosphoric acid solution into the manifold 53.

The rate of flow of water during operation of the plant in an eight hour cycle with eight leaching tanks each having a capacity for treating 40 tons of superphosphate at one time is maintained in the weak end of the series at about 10 to 12 gallons per minute. This would be correspondingly changed for plants of different capacities and operating under a 10 or 12 hour or other cycle. The acid rate of flow is also maintained at a constant, uniform flow such that about 18 pounds of sulphuric acid (98%) are used for every 100 pounds of superphosphate introduced into each cycle, the superphosphate containing about 20.5 to 21 per cent total $P_2O_5$.

During the passage of solution from one leaching tank to the next in the series in an 8 hour cycle, the flow is maintained at a rate equivalent to the passage of about sixty pounds of the solution per 100 pounds of superphosphate over about an eight hour period. This flow is controlled by properly adjusting the air pressure in the manifold 54 and the valves 29 in the air pipes 30 controlled by the floats 28 in each leaching tank. A pressure regulator 98 and a pressure indicator 99 may also be provided in the manifold 54 for control purposes.

Figure 7:
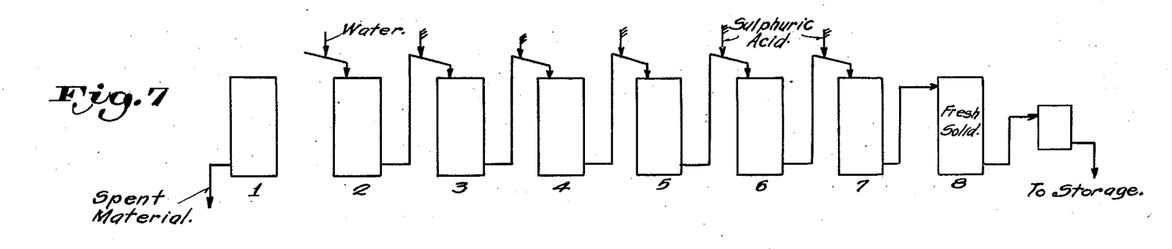
Figs. 7, 8 and 9 are flow diagrams illustrating different stages in the process.
Figure 8:
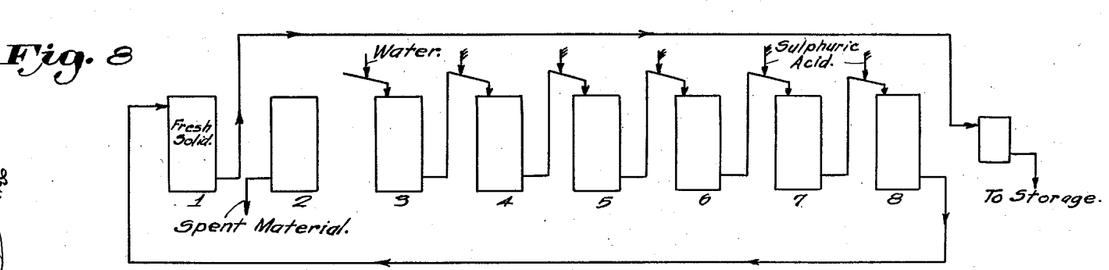
Figure 9:
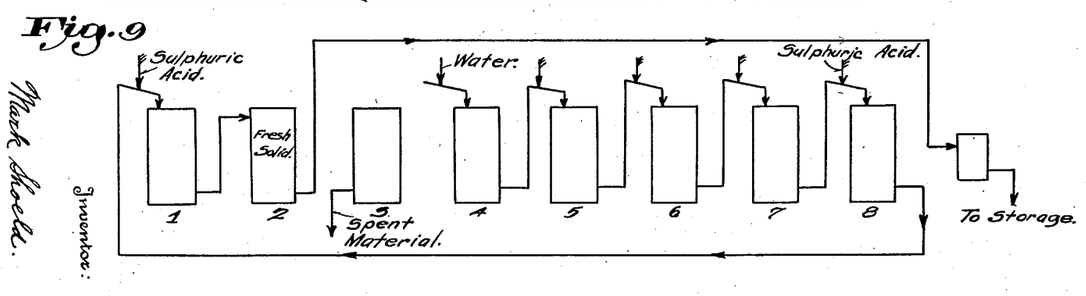

The diagrams in Figs. 7, 8 and 9 illustrate three successive stages in a cycle after operation is established. In Fig. 7, tank 1 has just been temporarily taken out of the cycle to remove spent material. Water alone is now being passed into tank 2. As will be seen in later stages, water is introduced into the tank that succeeds the tank that is being emptied of spent material and filled with fresh superphosphate.

In the cycle illustrated in Fig. 7, while flow is maintained from the bottom of one tank into the top of the next, sulphuric acid (98%) is being distributed in five tanks (3 to 7) succeeding the tank into which water is fed. By distributing the acid over a plurality of leaching tanks, external calcium sulphate precipitation is inhibited. No calcium sulphate is present in the phosphoric acid produced. No dense coating of calcium sulphate is produced on the superphosphate granules whereby proper penetration of acid into the porous particles is apt to be prevented. Furthermore there are no local accumulations of calcium sulphate and therefore there is no clogging of passages between the particles of superphosphate. The leaching that takes place with the above patented superphosphate is believed to be accomplished to a great extent by an osmotic effect. Strong phosporic acid is formed inside the pores of each granule. Weaker solution coming into contact with the granules diffuses into the pores and is washed out by succeeding streams of leaching liquid. By the end of a cycle the tank through which water is passed contains spent material containing as little as 1% $P_2O_5$, the reaction having taken place practically throughout each granule as well as throughout each bed.

Tank 8, in the stage illustrated in Fig. 7, has been filled with fresh superphosphate mixed with phosphoric acid solution. The phosphoric acid solution for this purpose is solution that has been collected in tank 82 or 83 during a previous stage. One or the other of the collecting tanks 82 or 83 is always kept full so that when a leaching tank is empty, the solution is ready to be passed into the leaching tank to fill it halfway. Thereupon the fresh superphosphate charge is deposited in the leaching tank. In this way any unreacted sulphuric acid present in the phosphoric acid solution is certain to be used up in contact with the fresh superphosphate.

In the stage shown in Fig. 7, the solution from the bottom of tank 7 is passed into tank 8 on top of the charge therein without sulphuric acid from the acid tanks 42 and 43. Sulphuric acid carried from tank 7 with the leached phosphoric acid in its higher concentration is also relatively quickly used up so that the solution initially at least coming from the bottom of tank 8 is ready to be pumped to production through the pipe 88 that passes to storage. The flow to storage is continued until a predetermined amount of phosphoric acid is removed from the last charged tank in a series. This removed acid is pumped to fill one of the tanks 82 or 83 for use in the next charge and the "make" passed to storage. When a signal sounds for the tank being filled, the operator is warned in plenty time to properly direct the flow.

A variation in the use of the tanks 82 and 83 may be referred to, namely, solution from tank 8 (Fig. 7) may be pumped into tank 82 until half full, the flow then switched to tank 83 to conduct a portion to storage, and the flow switched back to tank 82 to fill the latter.

It is noted that the concentration of the phosphoric acid solution produced by the present process is the equivalent of over 40% $P_2O_5$ and this may be as high as 50%. In fact the amount of phosphoric acid passed to production in any given type of cycle regulates the concentration of the product.

In the stage of operation illustrated in Fig. 8, phosphoric acid solution is being pumped to production from the bottom of the newly charged tank 1. Tank 2 is being emptied and solution from the bottom of tank 8 is being pumped into the top of tank 1, while water is passed into tank 3 and acid in the intermediate tank 4—8. Fig. 9 illustrates the next stage with the above steps advanced by one tank.

In shutting down the operation of the plant the starting operations previously described may be reversed, whereby the leaching in each tank is eventually completed.

No special distributors for applying liquid over the beds are necessary. The liquid applied readily proceeds down through the relatively deep beds without channelling. The particular superphosphate granules referred to retain their strength and shape throughout the extraction process so that free passage of liquid through a bed is maintained. Besides rendering filtration of the phosphoric acid product unnecessary, evaporation thereof is likewise not necessary. It is ready for commercial use as for instance in the manufacture of triple superphosphate.

The invention as hereinabove set forth is embodied and practiced in particular manners but may be variously embodied and practiced within the scope of the following claims.

What is claimed is:

1. A process of manufacturing phosphoric acid, comprising submerging in an aqueous sulfuric acid leaching medium a quiescent bed containing preformed superphosphate granules for effecting diffusion of the said medium throughout the depth of the bed and to form phosphoric acid and calcium sulphate, and withdrawing from the bottom of said bed said phosphoric acid dissolved in said aqueous medium.

2. A process of manufacturing phosphoric acid comprising submerging in an aqueous sulfuric acid leaching medium a relatively deep quiescent bed containing preformed superphosphate granules to form phosphoric acid and calcium sulphate, and withdrawing from said bed said phosphoric acid dissolved in said aqueous medium.

3. A process of manufacturing phosphoric acid comprising treating a relatively deep quiescent bed of preformed granules of superphosphate with sulphuric acid to form phosphoric acid and calcium sulphate in the granules, passing water through said bed of acid-treated granules and withdrawing water containing dissolved phosphoric acid from said bed.

4. A process of manufacturing phosphoric acid comprising submerging in sulphuric acid dissolved in an aqueous medium a relatively deep quiescent bed containing preformed superphosphate granules to form phosphoric acid and calcium sulphate, and while maintaining said bed so submerged and said granules stationary with respect to each other passing said aqueous medium into said bed and withdrawing phosphoric acid solution from said bed.

5. A process of manufacturing phosphoric acid comprising forming a deep bed of preformed superphosphate granules in a leaching tank, maintaining said bed in a quiescent state covered with sulfuric acid so as to react with said granules and form phosphoric acid and CaSO₄ in said granules, passing water into the tank while the bed is submerged and withdrawing phosphoric acid from said bed.

6. In the manufacture of phosphoric acid from superphosphate, subjecting preformed granules of superphosphate in a quiescent bed to the action of sulphuric acid to form phosphoric acid, passing an aqueous medium through the resulting acid-treated bed and submerging it in said medium, and removing extracted phosphoric acid from the bed while maintaining granules unremoved from said bed submerged in said medium.

7. In the manufacture of phosphoric acid, the steps comprising depositing preformed superphosphate granules into a body of sulphuric acid solution for reacting with the superphosphate to form phosphoric acid while completely submerged and quiescent in said acid solution, continuing the deposition of superphosphate granules until a deep bed is formed in the acid solution, and subsequently passing water through the bed to remove phosphoric acid therefrom.

8. In the production of phosphoric acid solution by leaching acid-treated superphosphate while maintaining particles of said superphosphate in a deep bed stationary with respect to each other, the said particles being preformed, discrete, indurated nodules of relatively high compression strength by reason of a combined tumbling and heat-treatment operation; charging an extraction zone with said particles of superphosphate and forming a deep bed of said particles in said zone, reacting said superphosphate with sulphuric acid in said bed and completely submerging it in resulting acid solution in said zone, passing water continuously at a predetermined rate into said zone while extracting phosphoric acid from said particles, the said particles retaining substantially their original shape throughout the extraction process thereby maintaining free passage of liquid throughout the bed, withdrawing extracted phosphoric acid solution from said zone, and removing the spent particles from the extraction zone.

9. In the manufacture of phosphoric acid from superphosphate, passing an aqueous extraction medium successively through a plurality of extraction zones containing material resulting from the treatment of preformed granules of superphosphate in unagitated beds in said zones with sulphuric acid to convert the superphosphate in the granules into phosphoric acid, and while maintaining granules in said acid-treated beds unremoved therefrom quiescent and submerged in said aqueous extraction medium continuing the passage of said medium successively through said zones and withdrawing from an end zone phosphoric acid solution of relatively high concentration.

10. In the manufacture of phosphoric acid from superphosphate, passing an aqueous extraction medium successively, downwardly through a plurality of extraction zones containing preformed granules of superphosphate in quiescent, bulksome beds that have been treated with sulphuric acid to convert the superphosphate in the granules into phosphoric acid, and while maintaining said beds submerged and quiescent in said aqueous extraction medium continuing the passage thereof successively, downwardly through said zones and withdrawing directly from an end zone a phosphoric acid solution of high concentration equivalent to a $P_2O_5$ content of over substantially 40%.

11. In the manufacture of phosphoric acid from superphosphate, contacting unreacted superphosphate and sulphuric acid in an aqueous medium in one of a plurality of interconnected zones containing unreacted superphosphate to convert superphosphate in said one zone into phosphoric acid, passing the resulting solution containing uncharged sulphuric acid successively through others of said zones and submerging in said solution the unreacted superphosphate remaining in said latter zones, the said superphosphate being initially preformed granules thereof in quiescent beds in each zone and said conversion taking place in said beds while submerged in said aqueous medium, and subsequently passing water through said first-mentioned one zone and passing solution from the last of said zones through a zone containing fresh superphosphate.

12. In the production of phosphoric acid solution by leaching acid-treated superphosphate while maintaining particles of said superphosphate in a bed stationary with respect to each other, the said particles comprising preformed, discrete, indurated porous nodules of relatively high compression strength by reason of a combined tumbling and heat-treatment operation; introducing into said bed, and covering it with, sulphuric acid dissolved in an aqueous medium to react with said superphosphate and form phosphoric acid and calcium sulphate in the said nodules, and while maintaining said bed so covered, continuously passing water into said bed to diffuse into the pores of said so-treated nodules by an osmotic effect between weaker acid outside the nodules and stronger acid within the nodules and continuously removing phosphoric acid solution from said nodules in a stream of infiltrated water.

13. In the manufacture of phosphoric acid from superphosphate, passing water through the first of a series of interconnected extraction zones in contact with material resulting from the treatment, in said first zone, of preformed superphosphate granules in a deep bed therein with sulphuric acid to convert superphosphate in said granules into phosphoric acid, and while passing sulphuric acid into an intermediate zone in said series in contact with unreacted phosphate material remaining from such acid treatment of preformed superphosphate granules in a deep bed in the latter zone, passing acid solution from each zone, including the first, into the next succeeding zone in said series containing unreacted phosphate material remaining from such acid treatment of preformed granules of superphosphate in a deep bed in said succeeding zone; and passing acid solution from the last of said series of zones through a zone in contact with unreacted, preformed superphosphate granules, to obtain aqueous phosphoric acid solution.

14. In the manufacture of phosphoric acid from superphosphate, passing water through the first of a series of interconnected extraction zones in contact with material resulting from the treatment, in said first zone, of preformed superphosphate granules in a deep bed therein with sulphuric acid to convert superphosphate in the granules into phosphoric acid, and while passing sulphuric acid into an intermediate zone in said series in contact with unreacted phosphate material remaining from such acid treatment of preformed superphosphate granules in a deep bed therein passing acid solution from each zone, including the first, into the next succeeding zone in said series containing unreacted phosphate material remaining from such acid treatment of preformed granules of superphosphate in a deep bed in said succeeding zone, the said sulphuric acid for said intermediate zone having been previously admixed with solution from the zone preceding the said intermediate zone, passing solution from the last of said series of zones through a bed in contact with fresh superphosphate, and withdrawing directly from the latter bed aqueous phosphoric acid solution of high concentration.

15. In the manufacture of phosphoric acid from superphosphate, passing water at a predetermined rate of flow through the first of a series of interconnected extraction zones in contact with material resulting from the treatment, in said first zone, of preformed superphosphate granules in a deep bed for a predetermined period of time with sulphuric acid to form phosphoric acid in the granules, controlling the rate of flow of said water while passing sulphuric acid at a predetermined rate of flow into intermediate zones in contact with unreacted phosphate material remaining from such acid treatment of preformed superphosphate granules in a deep bed in each zone and while passing solution from each zone including the first at a predetermined rate into a next succeeding zone in said series containing unreacted phosphate material remaining from said acid treatment of preformed granules of superphosphate in a deep bed, each of said beds being maintained submerged in said solution, and passing solution from the last of said series of zones through a zone at a predetermined rate in contact with fresh superphosphate, and withdrawing directly from the latter zone aqueous phosphoric acid solution of relatively high concentration.

16. In the manufacture of phosphoric acid from superphosphate, passing water at a predetermined rate of flow through the first of a series of interconnected extraction zones in contact with material resulting from the tretament of preformed superphosphate granules in a deep bed for a predetermined period of time with sulphuric acid to form phosphoric acid in the granules, controlling the rate of flow of said water while passing sulphuric acid at a predetermined rate of flow into intermediate zones in contact with unreacted phosphate material remaining from such acid treatment of preformed superphosphate granules in a deep bed in each zone and while passing solution from each zone including the first at a predetermined rate into a next succeeding zone in said series, in admixture with the sulphuric acid introduced into such latter zone, passing solution from the last of said series of zones through a zone at a predetermined rate in contact with fresh superphosphate, the said fresh superphosphate being in the form of preformed granules and in a deep bed in last-mentioned zone, and withdrawing directly from the last zone an aqueous phosphoric acid solution of high concentration equivalent to a $P_2O_5$ content of over substantially 40%.

17. In the manufacture of phosphoric acid by treating preformed granules of superphosphate with sulphuric acid in a series of interconnected extraction zones in which the material under treatment is maintained in relatively deep beds, the steps comprising contacting a bed in a zone in which fresh superphosphate granules are placed with phosphoric acid solution containing a minimum concentration of sulphuric acid obtained from a previous extraction of a bed in said series, withdrawing phosphoric acid of relatively high concentration from the first-mentioned bed, contacting an intermediate bed in said series with fresh sulphuric acid and admixed phosphoric acid solution from a previously treated bed, washing a bed preceding said intermediate bed with fresh water, and removing exhausted material from the said water-washed bed.

18. In the manufacture of phosphoric acid by treating preformed granules of superphosphate with sulphuric acid in a series of interconnected extraction zones in each of which the material is maintained in a separate quiescent bed for successive treatment in a cycle, the steps of contacting a bed in said series in said cycle, in which bed fresh preformed superphosphate granules are placed, with phosphoric acid solution containing a minimum concentration of sulphuric acid obtained from a previous extraction in a preceding bed in said series, withdrawing phosphoric acid of reltaively high concentration from the first-mentioned bed in the series and as a product from the said cycle, contacting an intermediate bed in said series with fresh sulphuric acid and admixed phosphoric acid solution from a previously treated bed in said cycle, washing with water a bed in a zone in said cycle preceding said intermediate bed, and removing exhausted material from said zone and from said cycle, refilling said last zone with superphosphate granules, and repeating the cycle, the bed in the said last zone taking the place of said first-mentioned bed.

MARK SHOELD.